(12) United States Patent
Nakazawa

(10) Patent No.: US 8,433,932 B2
(45) Date of Patent: Apr. 30, 2013

(54) POWER CIRCUIT, INFORMATION PROCESSING APPARATUS, AND POWER CONTROL METHOD BASED ON FIXED FREQUENCY CHARACTERISTIC OF CONTROL SIGNAL

(75) Inventor: Shigeaki Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 646 days.

(21) Appl. No.: 12/618,294

(22) Filed: Nov. 13, 2009

(65) Prior Publication Data

US 2010/0153753 A1    Jun. 17, 2010

(30) Foreign Application Priority Data

Dec. 15, 2008    (JP) ................................ 2008-318683

(51) Int. Cl.
*G06F 1/26*    (2006.01)
(52) U.S. Cl.
USPC .......................................... 713/300; 702/79

(58) Field of Classification Search .................. 713/300; 702/79
See application file for complete search history.

(56) References Cited

U.S. PATENT DOCUMENTS

| 6,510,068 B1 * | 1/2003 | Bors .............................. 363/163 |
| 7,684,462 B2 * | 3/2010 | Ye et al. ........................ 375/130 |
| 7,948,187 B2 * | 5/2011 | Greening et al. ....... 315/209 PZ |

FOREIGN PATENT DOCUMENTS

| JP | 2001-125691 | 5/2001 |
| JP | 2006-23645 | 1/2006 |
| JP | 2006-288104 | 10/2006 |

* cited by examiner

*Primary Examiner* — Albert Wang
(74) *Attorney, Agent, or Firm* — Staas & Halsey LLP

(57) ABSTRACT

A power circuit, information processing apparatus, and power control method are provided. The power circuit includes a determining unit configured to determine whether a control signal provided to control a power source has a fixed frequency characteristic, and an adjusting unit configured to randomly change time when a voltage transmitted to the power source is changed within a prescribed range when the determining unit determines that the control signal has the fixed frequency characteristic.

17 Claims, 15 Drawing Sheets

POWER CIRCUIT, INFORMATION PROCESSING APPARATUS, AND POWER CONTROL METHOD BASED ON FIXED FREQUENCY CHARACTERISTIC OF CONTROL SIGNAL

CROSS-REFERENCE TO RELATED APPLICATIONS(S)

This application is related to and claims priority to Japanese Patent Application No. 2008-318683, filed on Dec. 15, 2008, and incorporated herein by reference.

BACKGROUND

1. Field

The embodiments discussed herein are directed to a power circuit and method of power control.

2. Description of the Related Art

Improvements in the capabilities of personal computers (hereinafter referred to as PCs) have become significant and contributed to advances in the information processing community. One of factors responsible for the above-described improvements is the increasing performances of central processing units (CPUs). However, the power consumption and the heating value of the CPUs have also been increasing in recent years causing a problem of how to keep the performances, the power consumption, and the heating value of the CPUs within predetermined bounds.

When a PC performs simple processing, the use of a control system arranged to reduce the power consumption by decreasing the voltage of a power source provided for the CPU has become commonplace. Especially when a mobile PC is used, the control system may be used to increase the battery retaining time.

FIG. 1. As illustrated in FIG. 1, the PC 10 is provided as a mobile PC, and includes a CPU 101, a peripheral large scale integration (LSI) circuit 102 including a chip set or the like, a hard disk device (HDD), various input/output devices 103 including a hard disk device (HDD), a keyboard, etc., a universal serial bus (USB) connector 104a, a local area network (LAN) connector 104b, an external monitor output connector 104c, an external power input unit 105, a charging circuit 106, various power sources 107, and a CPU core power source 110.

The CPU 101 executes various calculation processings. The peripheral LSI circuit 102 controls information exchanged between the internal various input/output devices 103 based on instructions of the CPU 101. Further, the peripheral LSI circuit 102 controls information exchanged between the PC 10 and various USB devices 23, various communication devices 24, and an external monitor 25 via the individual USB connector 104a, LAN connector 104b, and external monitor output connector 104c.

The external power input unit 105 distributes power supplied from an alternating current (AC) adapter 21 and/or an internal and/or external battery 22 to the charging circuit 106, the various power sources 107, and the CPU core power source 110. The charging circuit 106 controls charging of the battery 22. Each of the various power sources 107 supplies power to each of the components except the CPU 101, so as to drive each of the components except the CPU 101.

The CPU core power source 110 includes a power control unit 111, an oscillation circuit 118, and a smoothing circuit 119, and supplies power used to drive the CPU 101. The oscillation circuit 118 includes an input capacitor and/or a field effect transistor (FET), and generates a clock pulse signal. The smoothing circuit 119 includes a coil and/or an output capacitor, smoothes the clock pulse signal, and supplies the smoothed clock pulse signal to the CPU 101 as power.

The power control unit 111 includes a control signal input unit 112, a digital-to-analog (D/A) converter 113, a reference voltage generating unit 114, an error amplifier unit 115, a pulse width modulation (PWM) generating unit 116, and a driver unit 117, and controls the oscillation circuit 118.

The control signal input unit 112 receives a power voltage control signal transmitted from the CPU 101. The D/A converter 113 converts the power voltage control signal into an analog signal, and the reference voltage generating unit 114 generates a reference voltage based on the power voltage control signal converted into the analog signal. The error amplifier unit 115 compares the reference voltage to a voltage transmitted from the smoothing circuit 119, and transmits data of the difference between the above-described voltages. The PWM generating unit 116 transmits an oscillation control signal subjected to PWM modulation performed based on the magnitude of the data transmitted from the error amplifier unit 115. The driver unit 117 drives the oscillation circuit 118 based on the oscillation control signal.

When PC 10 performs simple processing, interrupt processing may be periodically performed by recovering a voltage so as to control the various devices, for example, even though the voltage of the power source provided for the CPU 101 is reduced to some extent. Since the output capacitor may be provided with many electric charges so as to recover the voltage, a large current periodically occurs in the CPU core power source 110.

Then, when the large current flows into the CPU core power source 110, a distortion occurs in the capacitor and/or the coil due to the occurrence of an electromagnetic field, and the distortion propagates to a print substrate. Therefore, when the voltage is periodically recovered, as illustrated in FIG. 4, the print substrate is periodically vibrated. Then, if the period is an audible frequency, the print substrate functions as a speaker, and the sound of the frequency corresponding to the period is generated from the entire print substrate.

The loudness of the above-described sound (hereinafter referred to as a "ringing sound") generated due to the vibration of the print substrate is so high that a person can perceive the ringing sound, which is often offensive to the person.

The ringing sound can be reduced to some extent by providing a specifically designed capacitor and/or a specifically designed coil as the above-described capacitor and coil. However, the reduction effect is often definitive and the parts used for the specifically designed capacitor and coil are often expensive. Further, even though the ringing sound can be reduced to some extent by adjusting the part arrangement and/or wiring, the reduction effect may be definitive. Further, being affected by other parts and/or wiring, the know-how to achieve the ringing sound reduction often becomes significantly difficult.

In addressing a ringing sound problem, conventionally a changing an intermittent control performed for the active state and the idle state of a CPU so that the CPU does not perform an intermittent operation at the same intervals as those at which the intermittent control is performed is disclosed.

SUMMARY

It is an aspect of the embodiments discussed herein to provide power circuit, information processing apparatus, and power control method.

The above aspects can be attained by a power circuit that includes a determining unit configured to determine whether a control signal provided to control a power source has a fixed frequency characteristic and an adjusting unit configured to randomly change time when a voltage transmitted to the power source is changed within a prescribed range when the determining unit determines that the control signal has the fixed frequency characteristic.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE EMBODIMENTS

A PC may be used as an exemplary information processing apparatus executing an exemplary power control method. The power control method can be used for various information processing apparatuses including, for example, a mobile terminal such as a mobile phone and/or a communication device such as a router device.

An above-described power control method allows for perceiving the periodicity of a power voltage control signal transmitted from a CPU. If the power voltage control signal has the periodicity, the time when the transmission of the power voltage control signal is started is moved up by as much as a random time.

Figure 1:
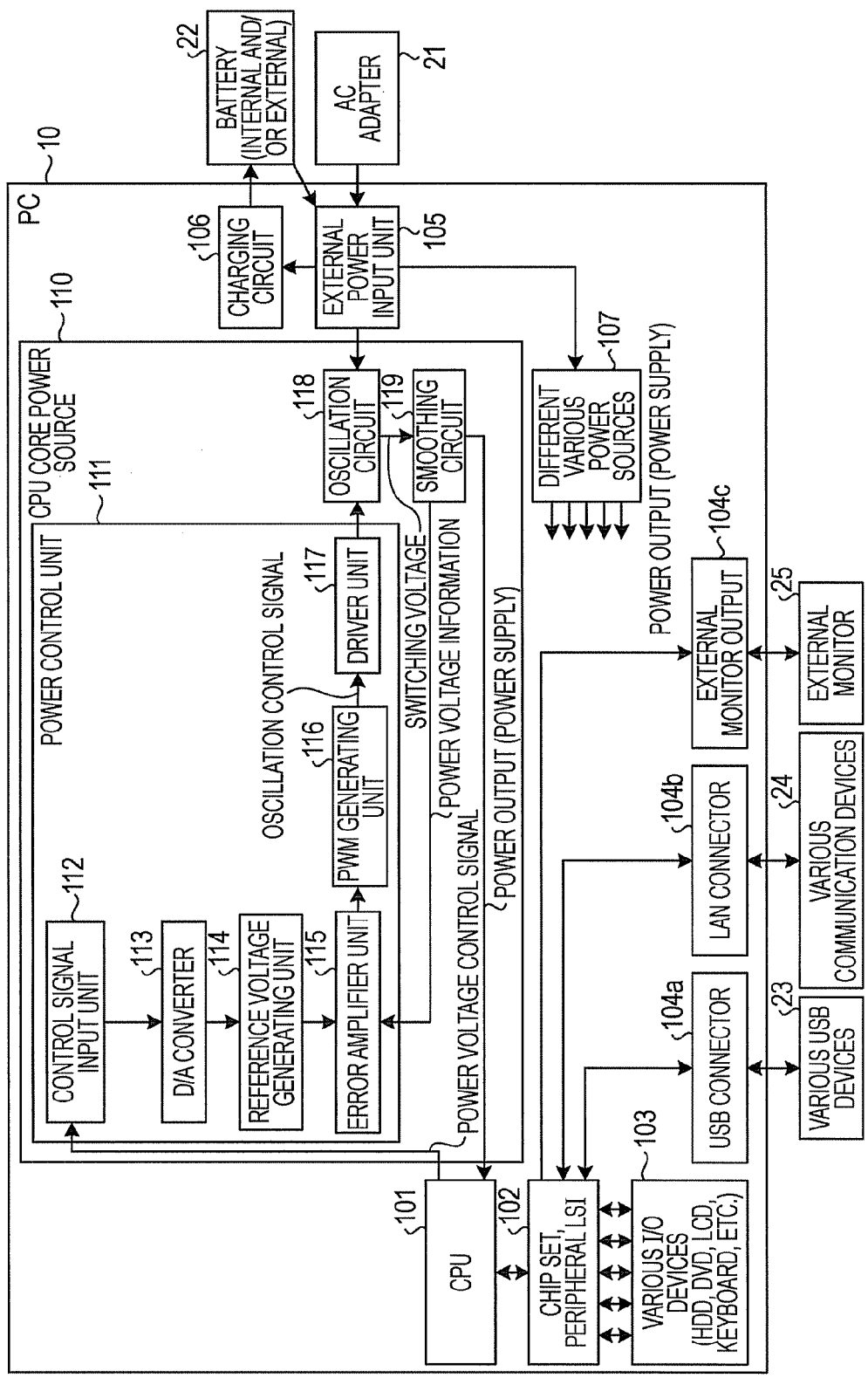
FIG. 1 illustrates a PC.
Figure 2:
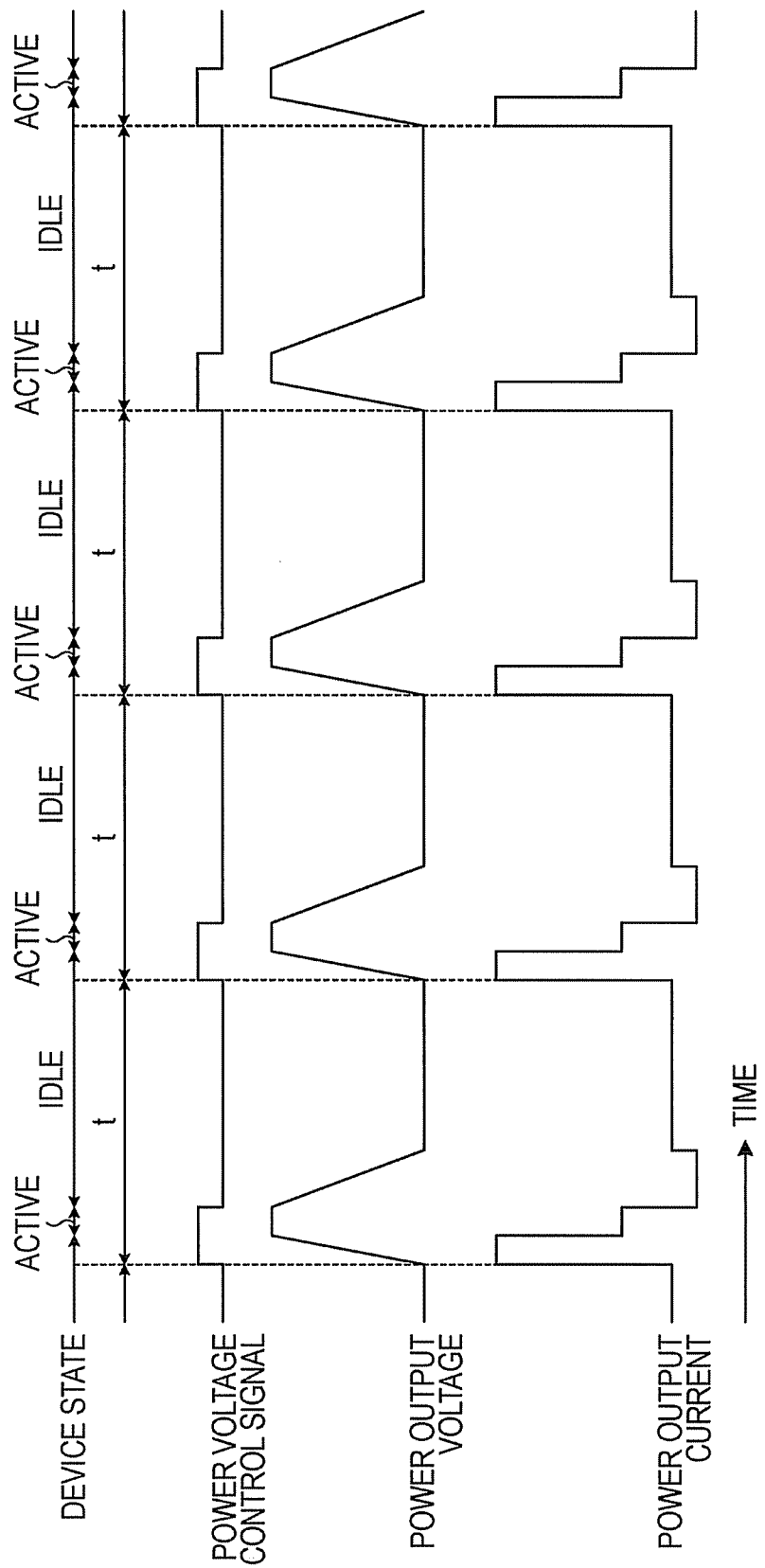
FIG. 2 illustrates a power control method.
Figure 3:
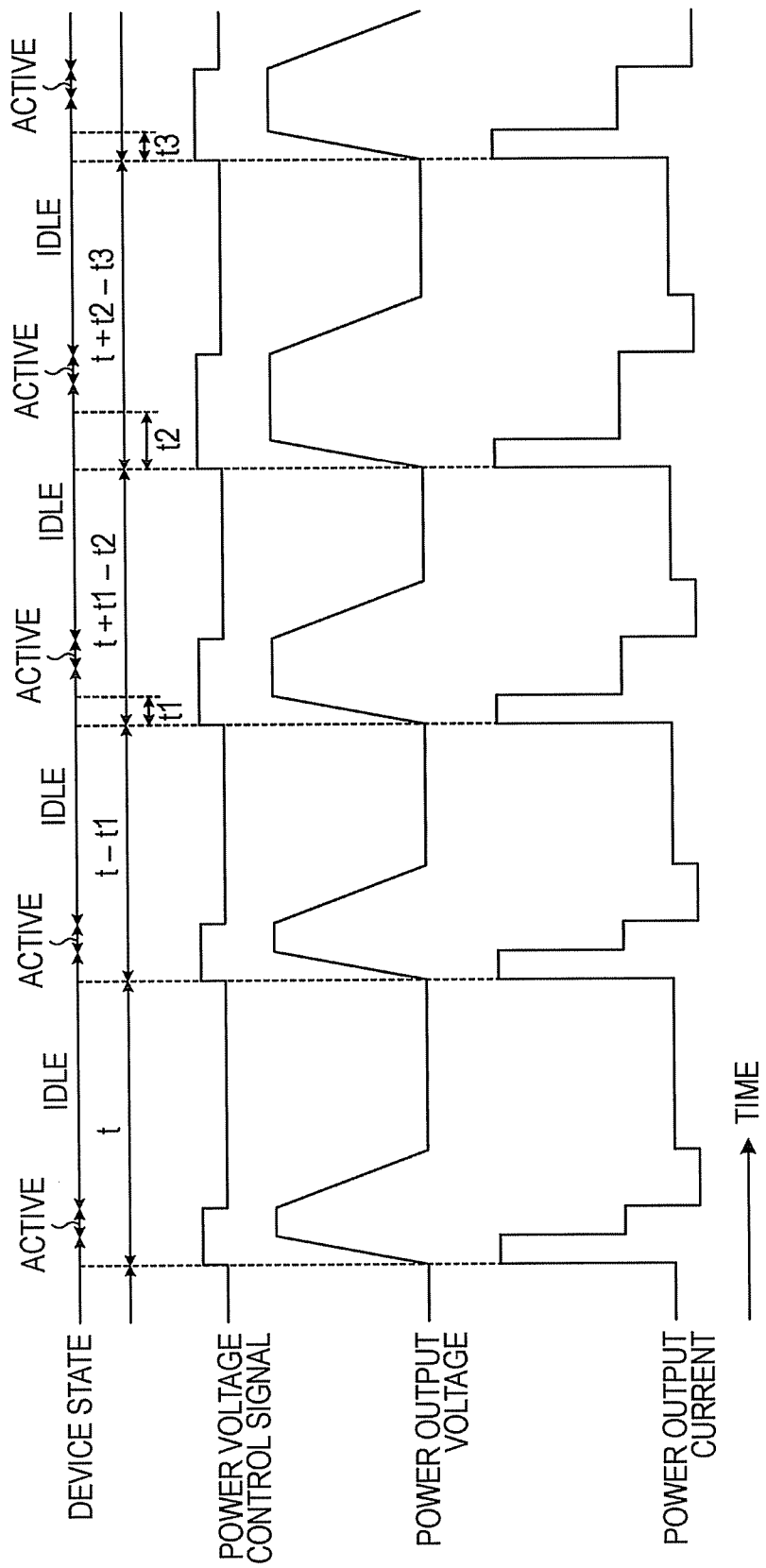
FIG. 3 illustrates a power control method according to a first embodiment.

When the CPU reenters the active state at fixed intervals t after being shifted from the active state to the idle state, a large current periodically occurs under ordinary power control and a ringing sound having a level which is high enough to be perceived by a person is generated so that the frequency of the ringing sound corresponds to the period. According to FIG. 3, the time when the transmission of the power voltage control signal is started is randomly moved up, as indicated by the signs t1, t2, or t3 so that the time when an output voltage is increased is changed. A control allows for distributing the periods where the large currents occur whereby the generated ringing sound is so reduced that the ringing sound is perceived by a person with difficulty.

Thus, the control achieved by changing the period where a voltage transmitted to the CPU is changed is effective to reduce the ringing sound. However, if the control is performed regardless of a state of a system, the system may not be provided with a sufficient power under heavy load conditions so that the operations of the system become unstable. Since the power control method moves up the time when the transmission of the power voltage control signal is started, a sufficient amount of power is supplied when the CPU is in the active state so that the system can operate with stability.

Further, since it is also important to reduce power consumption, the moved-up time may be within a relatively narrow range. A method of using a random number generating function of the CPU, a method of detecting the temperature of a predetermined part and using fluctuations of the detected temperature, etc. can be considered as the method of determining the random moved-up time.

A PC 40 executing the power control method is disclosed. Similar parts are designated by the same reference numerals so as to eliminate a repetition of the descriptions.

Figure 4:
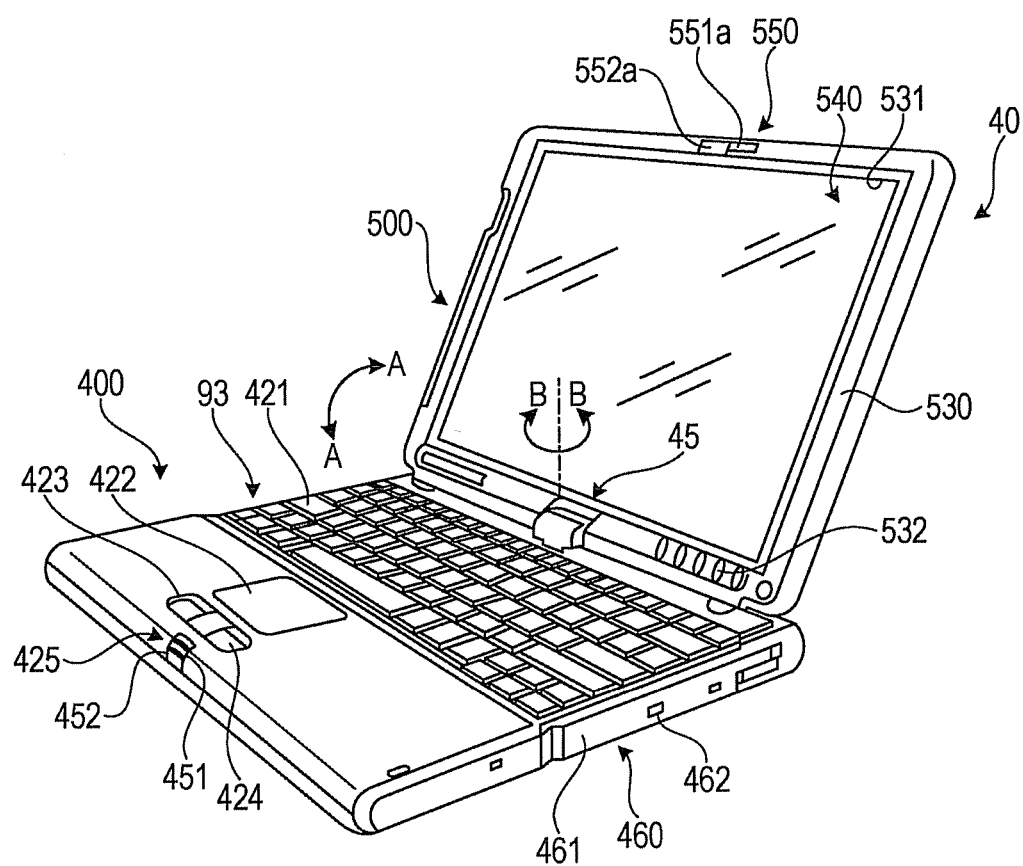
FIG. 4 illustrates an outer appearance of a PC according to the first embodiment.

FIG. 4 illustrates an outer appearance of PC 40 including a first unit 400 and a second unit 500. The first unit 400 and the second unit 500 may be coupled to each other through a biaxial coupling unit 45 so that the second unit 500 can be freely opened and closed in a direction indicated by an arrow A-A with reference to the first unit 400 and freely rotated in a direction indicated by an arrow B-B (about a vertical rotation axis). FIG. 4 illustrates that the second unit 500 is opened to the first unit 400 (open state).

The front face of the first unit 400 may be covered with an upper cover 93 on which a keyboard 421, a track pad 422, a left-click button 423, a right-click button 424, and a locking unit 425 are provided, where the locking unit 425 locks the second unit 500 when the second unit 500 is closed. The locking unit 425 includes a locking hole 451 into which a catch of the second unit 500 enters and a lock releasing button 452 provided to release the locking of the catch which had entered the locking hole 451.

The outer side face of the first unit 400 includes an open/close lid 461 of an optical disk drive 460 where an optical disk including a compact disk (CD), a digital versatile disk (DVD), and so forth is inserted into the optical disk drive 460 so that the optical disk drive 460 drives and accesses the optical disk. An eject button 462 may be provided on the open/close lid 461, where the open/close lid 461 is opened by pressing the eject button 462.

The CPU 101, a CPU core power source 410, for example, may be under the upper cover 93 of the first unit 400.

A cover 530 having a display window 531 may be provided on the front face of the second unit 500 of the PC 40. An internal display panel 540 spreads over the display window 531. Further, on the second unit 500, a plurality of press buttons 532 may be provided under the display panel 540, and a catch unit 550 is provided at a part defined on the display panel 540, where the catch unit 550 includes a catch which locks the locking unit 425 of the first unit 400 when the second unit 500 is closed. Further, the catch unit 550 includes two catches and any one of the two catches, that is, a catch 552a which sticks out from an opening 551a provided on the display screen side.

Figure 5:
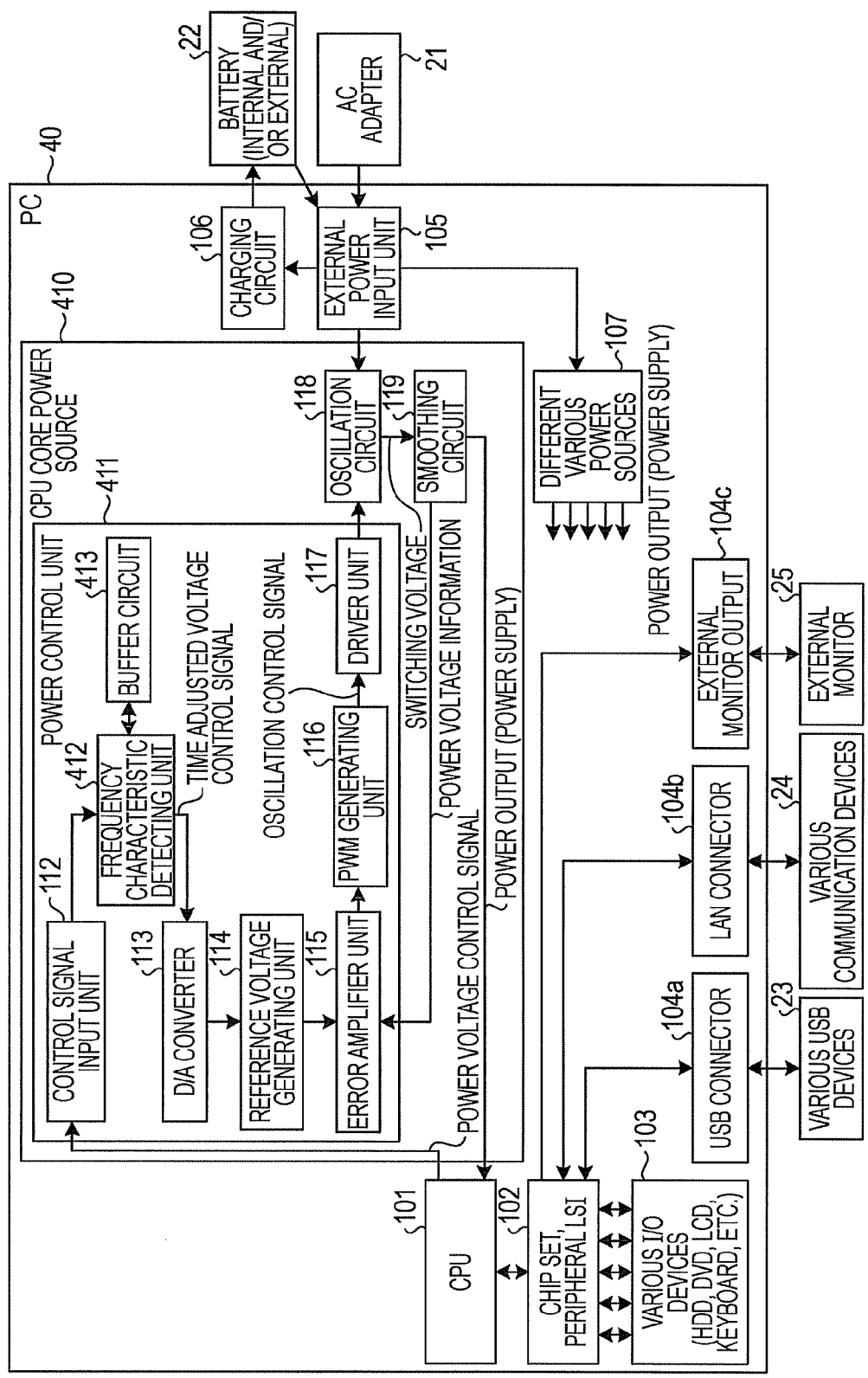
FIG. 5 illustrates a PC according to the first embodiment.

As illustrated in FIG. 5, the PC 40 includes the CPU 101, the peripheral LSI circuit 102, the various input/output devices 103, the USB connector 104a, the LAN connector 104b, the external monitor output connector 104c, the external power input unit 105, the charging circuit 106, the various power sources 107, and the CPU core power source 410.

The CPU core power source 410 includes a power control unit 411, an oscillation circuit 118, and the smoothing circuit 119, and supplies power used to drive the CPU 101. The power control unit 411 includes the control signal input unit 112, a frequency characteristic detecting unit 412, a buffer circuit 413, a D/A converter 113, the reference voltage generating unit 114, the error amplifier unit 115, the PWM generating unit 116, and the driver unit 117, and controls the oscillation circuit 118.

The frequency characteristic detecting unit 412 perceives the periodicity of a power voltage control signal transmitted to the control signal input unit 112. If the power voltage control signal has the periodicity, the frequency characteristic detecting unit 412 moves up the time when the transmission of the power voltage control signal is started by as much as a random time. The buffer circuit 413 temporarily stores information used to detect the periodicity of the power voltage control signal.

Figure 6:
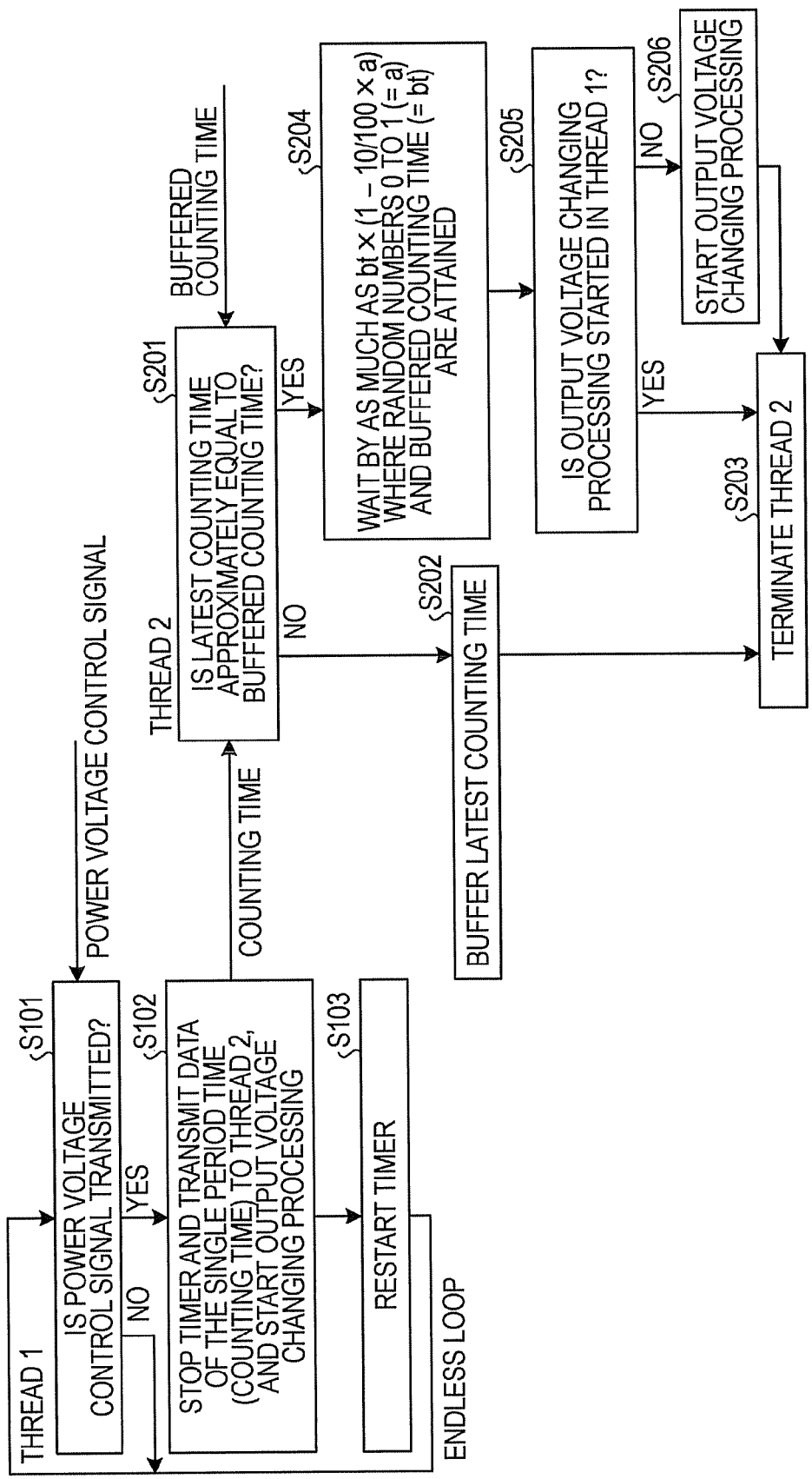
FIG. 6 illustrates processing procedures performed through a frequency characteristic detecting unit.

FIG. 6 illustrates processing procedures performed through the frequency characteristic detecting unit 412 illustrated in FIG. 5. In the above-described embodiment, the maximum value of the moved-up time is determined to be 10% of the period.

The frequency characteristic detecting unit 412 waits for the reception of an output control signal in a thread 1 at operation S101. Upon receiving the output control signal (Yes at operation S101), the frequency characteristic detecting unit 412 starts a thread 2, stops a timer, and notifies the thread 2 of the timer value as a counter value. The frequency characteristic detecting unit 412 transmits the output control signal and starts output voltage changing processing at operation S102. The frequency characteristic detecting unit 412 restarts the timer at operation S103 and restarts the processing procedures from operation S101.

In the thread 2, the frequency characteristic detecting unit 412 compares the counter value acquired from the notification provided through the thread 1 and a counter value of which data had been stored in the buffer circuit 413 at operation S201. If the above-described counter values are not approximately equal to each other (No at operation S201), it is considered that the power voltage control signal has no periodicity. Therefore, the frequency characteristic detecting unit 412 stores data of the counter value acquired from the notification provided through the thread 1 in the buffer circuit 413 at operation S202, and terminates the thread 2 without performing the moving-up processing at operation S203.

On the other hand, if the counter values are approximately equal to each other (Yes at operation S201), it is considered that the power voltage control signal has the periodicity. Therefore, the frequency characteristic detecting unit 412 waits by as much as a time T calculated through Equation (1) illustrated below at operation S204:

$$T = bt \times (1 - 10/100 \times a)$$ Equation (1)

The value "a" may represent a random number of which value is from 0 to 1, and the value "bt" may represent a counter value of which data had been stored in the buffer circuit 413. The time attained by waiting by as much as the time T calculated through Equation (1) may be the time attained by moving up the time when the power voltage control signal is changed next time by as much as 0 to 10% of the counter value bt.

After the waiting is finished, the frequency characteristic detecting unit 412 determines whether a power voltage control signal of the next period is transmitted and processing for changing an output voltage is started at operation S205. If the power voltage control signal of the next period is transmitted (Yes at operation S205), the periodicity had already been lost. Therefore, the frequency characteristic detecting unit 412 terminates the thread 2 without performing the moving-up processing at operation S203.

On the other hand, if the power voltage control signal of the next period is not transmitted (No at operation S205), the frequency characteristic detecting unit 412 performs the moving-up processing, transmits an output control signal, and starts the output voltage changing processing at operation S206. After that, the frequency characteristic detecting unit 412 terminates the thread 2 at operation S203.

Figure 7:
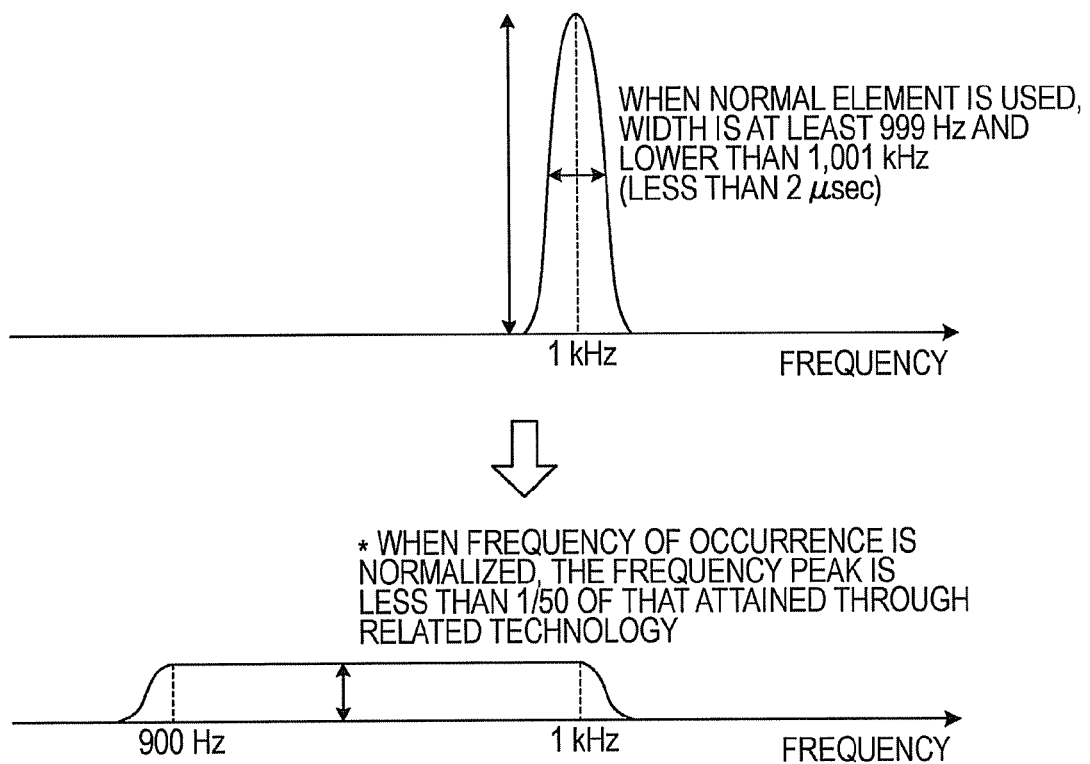
FIG. 7 illustrates an exemplary effect of a power control method.
Figure 8:
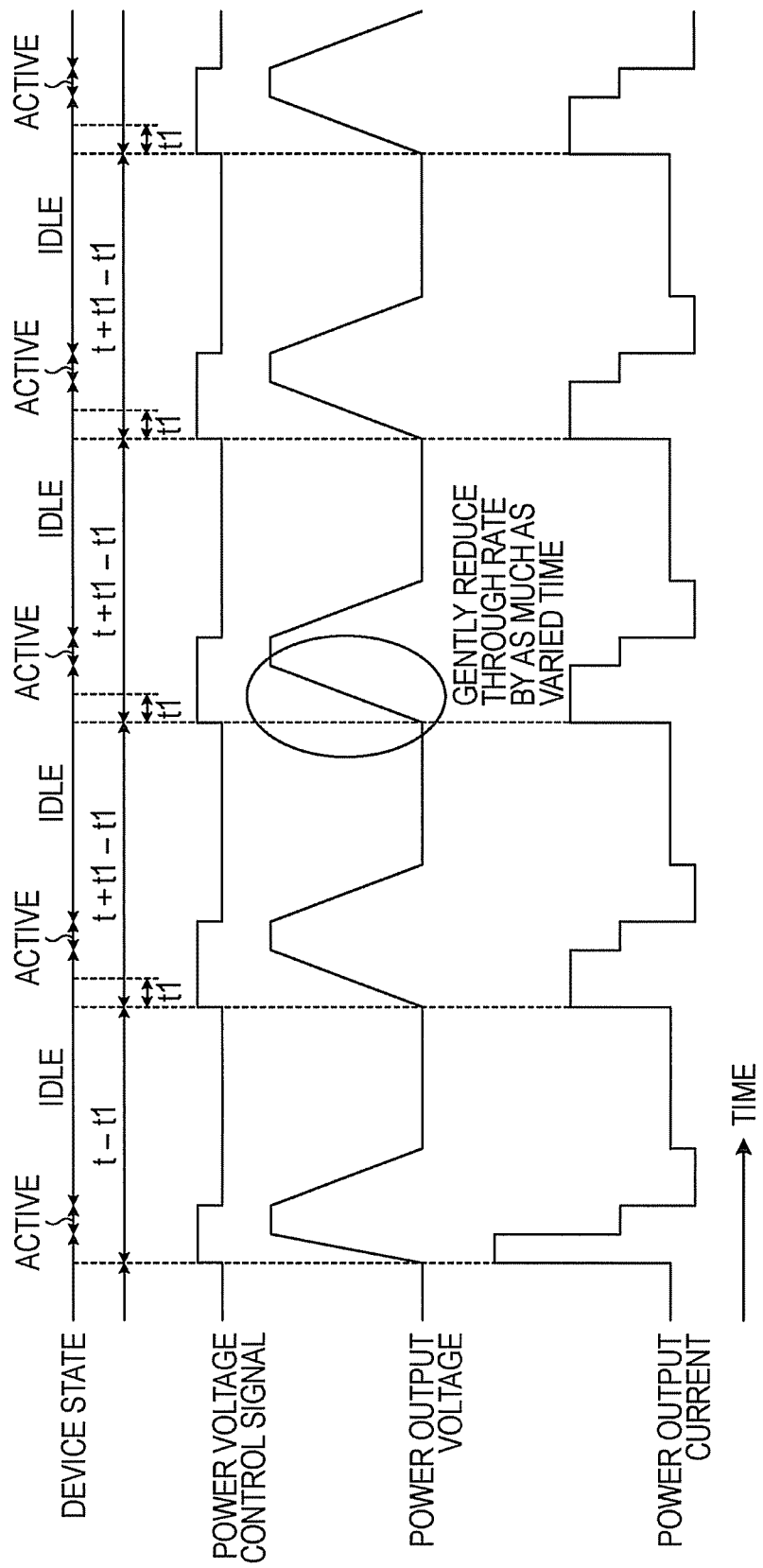
FIG. 8 illustrates an exemplary power control method.
Figure 9:
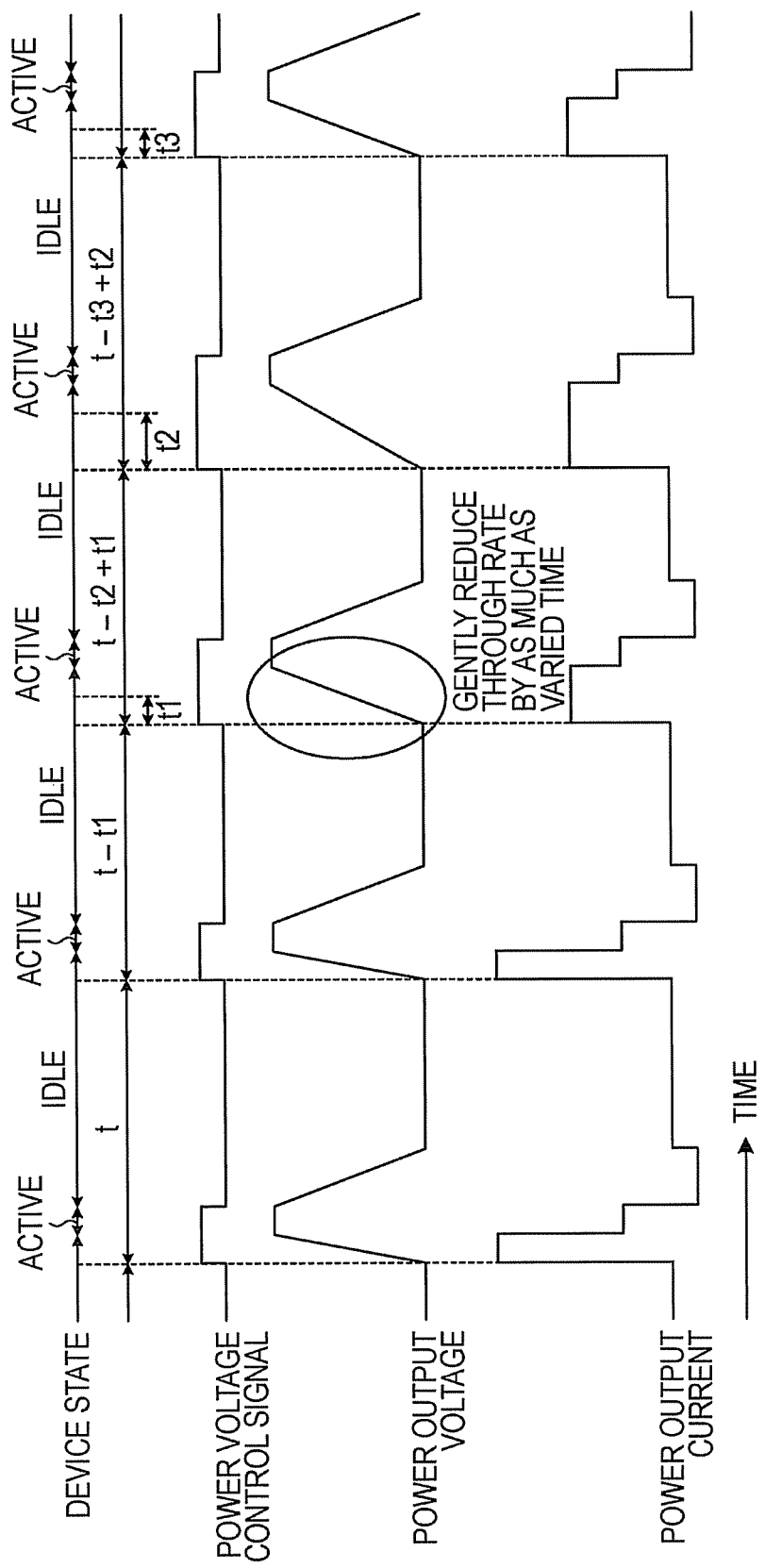
FIG. 9 illustrates an exemplary power control method.

FIG. 7 illustrates an effect obtained by using the power control method of the above-described embodiment, where the moved-up time is determined to be 100 μsec at the maximum, for an apparatus where the ringing sound corresponding to a frequency of 1 kHz or around is generated.

The peak height of the frequency is proportional to the loudness of the ringing sound, and a loud ringing sound occurs before using the power control method of the above-described embodiment. Through the use of the power control method of the above-described embodiment, the peak height is suppressed to less than 1/50 thereof so that the ringing sound is significantly reduced.

Thus, the time when the power voltage control signal is transmitted is moved up so that the time when the output voltage is increased is randomly changed. Consequently, the loudness of the ringing sound can be reduced.

The time when the power voltage control signal is transmitted may be moved up so that the time when the output voltage is increased is randomly changed. Alternatively, or in addition, the time may be randomly delayed time when the transmission of the power voltage control signal is terminated so that the time when the output voltage is decreased is randomly delayed.

The above-described exemplary configuration may be used in the case where a single periodicity is provided. However, if a plurality of periodicities is provided, an increased number of the buffer circuits 413 may be used so as to retain the counter value over a plurality of generations, and an increased number of patterns of the comparison performed at operation S201 executed in the thread 2 may be provided.

Further, a high frequency of periodicity may be detected by analyzing the periodicities of the generations through discrete Fourier transform (DFT) and/or fast Fourier transform (FFT), where data of the periodicities is stored in the buffer circuit 413.

Further, a method of suppressing the amount of the large generated current by gently decreasing a through rate at which the output voltage is changed by as much as the moved-up time is also effective to decrease the loudness of the ringing sound, as illustrated in FIGS. 6 and 7. The reason why the above-described method is effective is that the level of a current occurring when the voltage is recovered can be lowered by gently decreasing the through rate.

Figure 14:
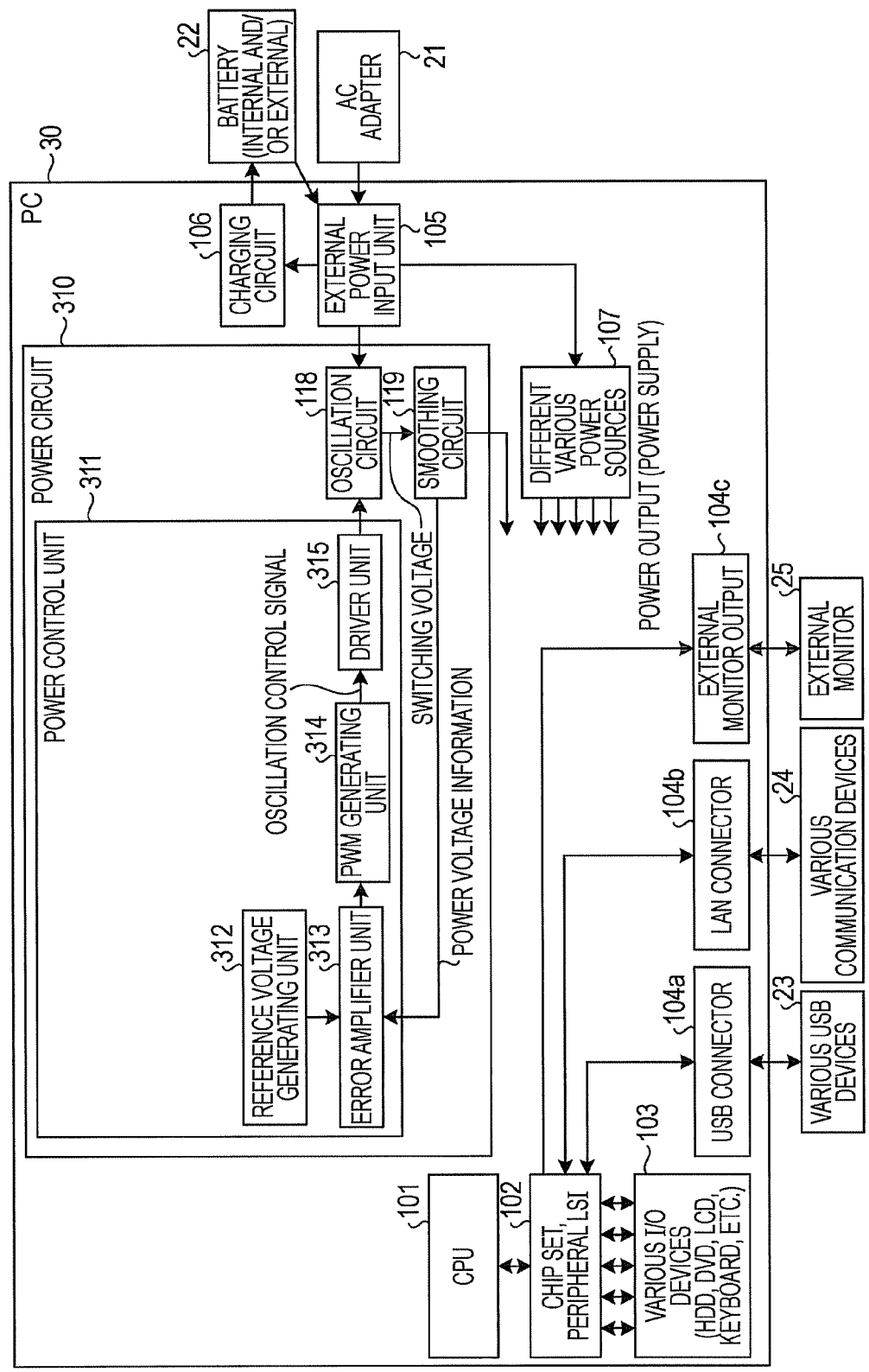
FIG. 14 illustrates a PC.

The power control method disclosed may be used to decrease the oscillation of a switching power source. FIG. 14 illustrates a PC 30, which includes the switching power source. As illustrated in FIG. 14, the PC 30 includes the CPU 101, the peripheral LSI circuit 102, the various input/output devices 103, the USB connector 104a, the LAN connector 104b, the external monitor output connector 104c, the external power input unit 105, the charging circuit 106, the various power sources 107, and a power circuit 310.

The power circuit 310 corresponds to the switching power source, and includes a power control unit 311, the oscillation circuit 118, and the smoothing circuit 119. The power control unit 311 includes a reference voltage generating unit 312, an error amplifier unit 313, a PWM generating unit 314, and a driver unit 315, and controls the oscillation circuit 118.

The reference voltage generating unit 312 generates a reference voltage. The error amplifier unit 313 compares the reference voltage to a voltage transmitted from the smoothing circuit 119, and transmits data of the difference between the above-described voltages. The PWM generating unit 314 transmits an oscillation control signal subjected to PWM modulation performed based on the magnitude of the data transmitted from the error amplifier unit 313. The oscillation control signal includes oscillation-ON information and oscillation-OFF information. The driver unit 315 drives the oscillation circuit 118 based on the oscillation control signal.

Figure 15:
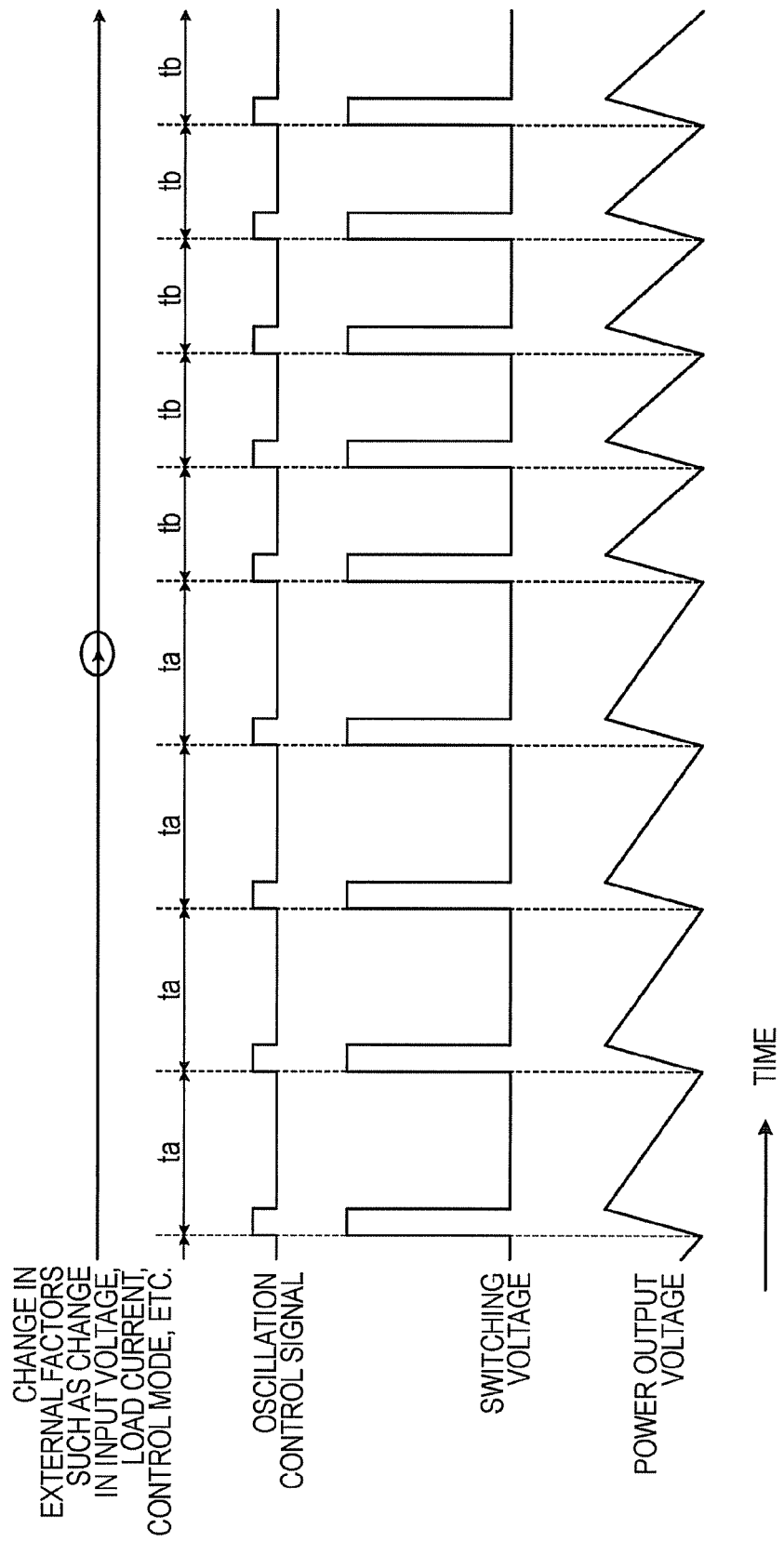
FIG. 15 illustrates a power control method.

The oscillation period of the switching power source illustrated in FIG. 14 is often changed due to a change in external factors, as illustrated in FIG. 15. However, as long as the external factors are constant, the oscillation period is often kept constant. If the oscillation period is constant, a ringing sound may be generated because of the constant oscillation period.

Figure 10:
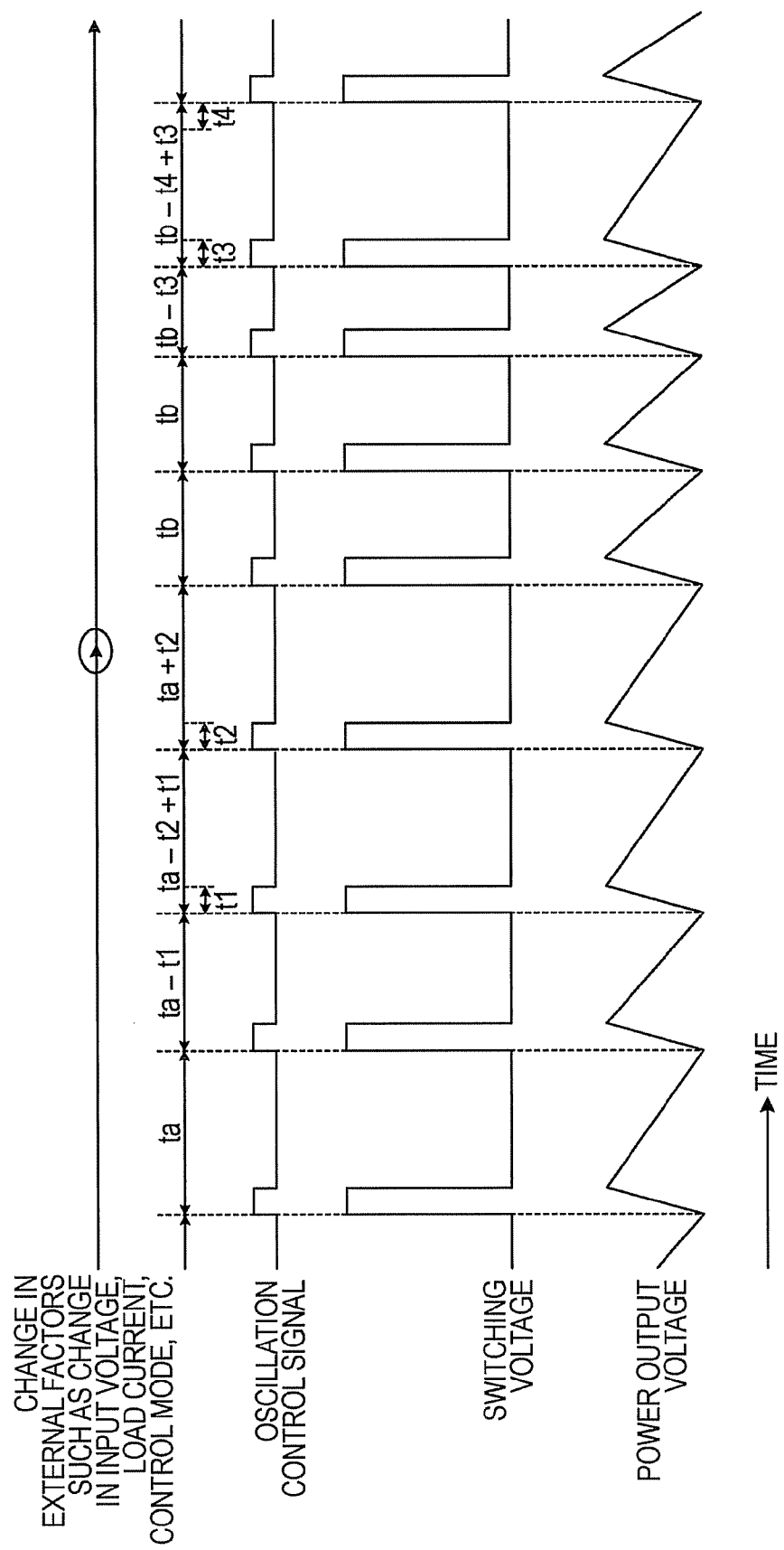
FIG. 10 illustrates an exemplary power control method according to a second embodiment.

FIG. 10 is a diagram illustrating an exemplary a power control method. As illustrated in FIG. 10, the loudness of the ringing sound can be decreased by changing the oscillation period.

Figure 11:
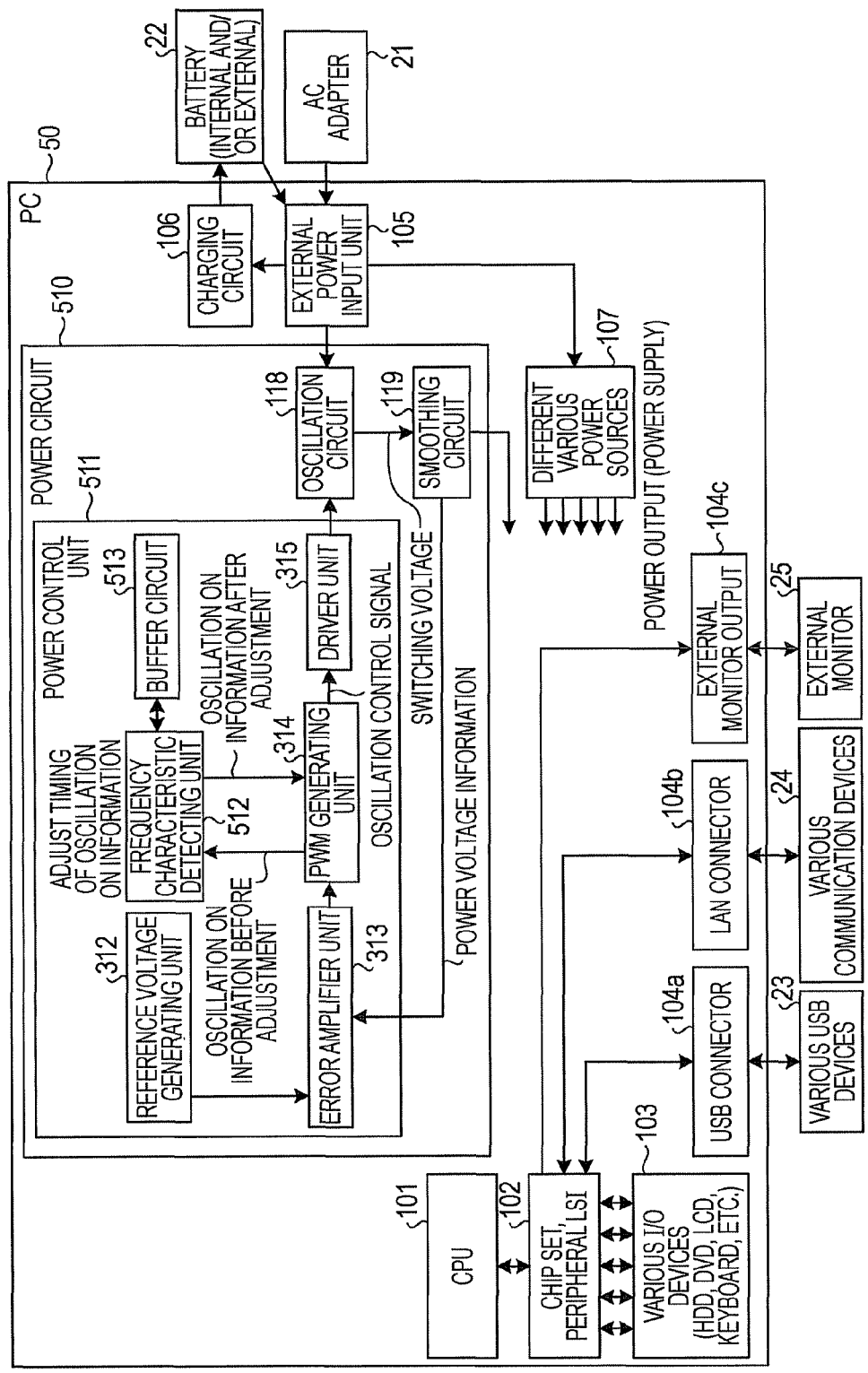
FIG. 11 illustrates an exemplary PC according to a second embodiment.

FIG. 11 illustrates PC 50. As illustrated in FIG. 11, the PC 50 includes the CPU 101, the peripheral LSI circuit 102, the various input/output devices 103, the USB connector 104a, the LAN connector 104b, the external monitor output connector 104c, the external power input unit 105, the charging circuit 106, the various power sources 107, and a power circuit 510.

The power circuit 510 corresponds to the switching power source, and includes a power control unit 511, the oscillation circuit 118, and the smoothing circuit 119. The power control unit 511 includes the reference voltage generating unit 312, the error amplifier unit 313, the PWM generating unit 314, the driver unit 315, a frequency characteristic detecting unit 512, and a buffer circuit 513, and controls the oscillation circuit 118.

The frequency characteristic detecting unit 512 perceives the periodicity of oscillation-ON information included in an oscillation control signal generated through the PWM generation unit 314. If the oscillation-ON information has the periodicity, the frequency characteristic detecting unit 512 moves up and/or down the time when the oscillation-ON information is transmitted by as much as a random time. The buffer circuit 513 temporarily stores information used to detect the periodicity of the oscillation-ON information.

Figure 12:
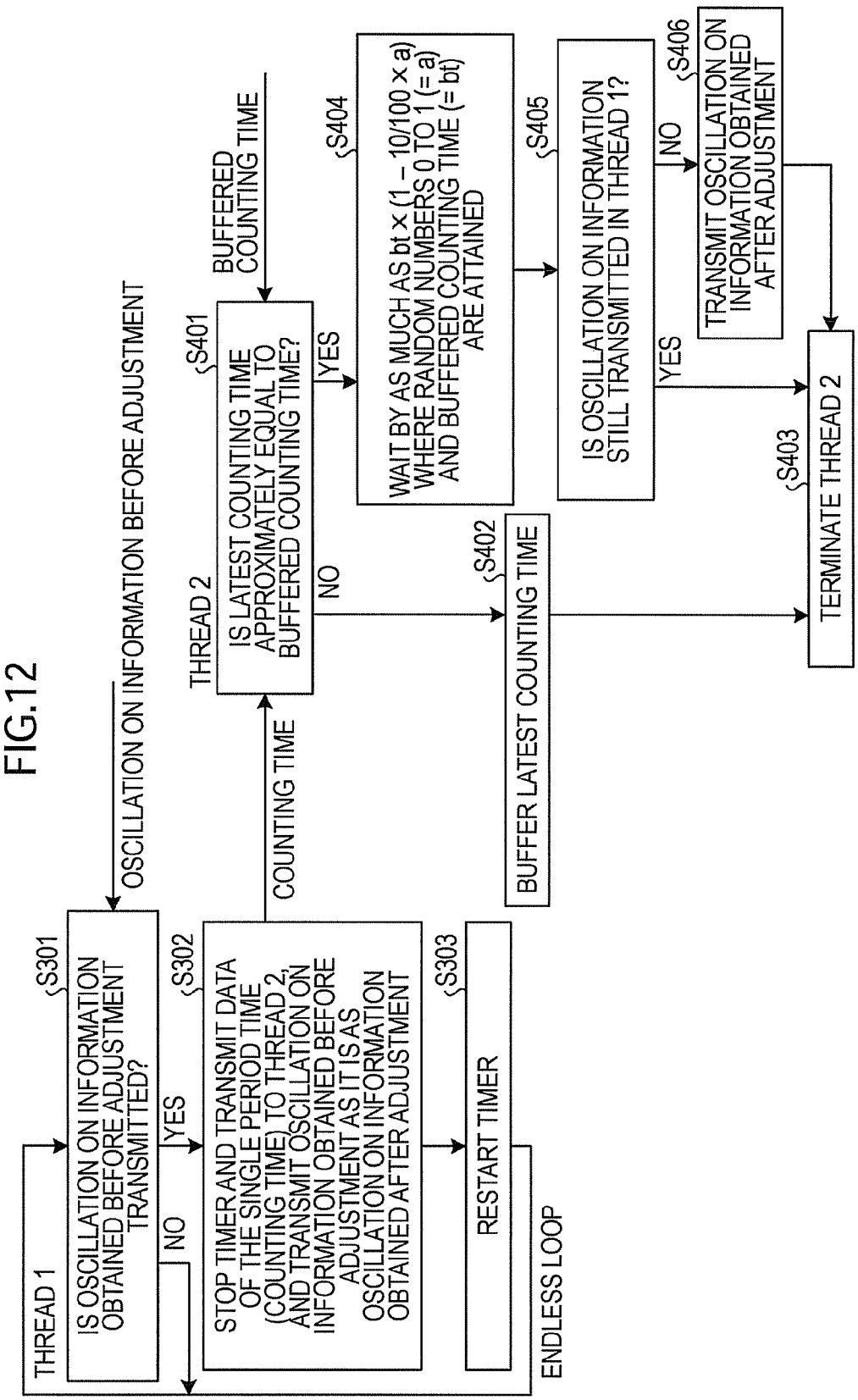
FIG. 12 illustrates processing procedures performed through another frequency characteristic detecting unit.

FIG. 12 illustrates processing procedures performed through the frequency characteristic detecting unit 512 illustrated in FIG. 11. The time when the oscillation-ON information is transmitted is moved up by as much as 10% of the period at the maximum.

The frequency characteristic detecting unit 512 waits for the reception of the oscillation-ON information in a thread 1 at operation S301. Upon receiving the oscillation-ON information (Yes at operation S301), the frequency characteristic detecting unit 512 starts a thread 2, stops a timer, and notifies the thread 2 of the timer value as a counter value. The frequency characteristic detecting unit 512 transmits the oscillation-ON information to be adjusted, as it is, as adjusted oscillation-ON information at operation S302. Next, the frequency characteristic detecting unit 512 restarts the timer at operation S303 and restarts the processing procedures from operation 8301.

In the thread 2, the frequency characteristic detecting unit 512 compares the counter value acquired from the notification provided through the thread 1 and a counter value of which data had been stored in the buffer circuit 513 at operation S401. If the above-described counter values are not approximately equal to each other (No at operation S401), it is considered that the oscillation-ON information has no periodicity. Therefore, the frequency characteristic detecting unit 512 stores data of the counter value acquired from the notification provided through the thread 1 in the buffer circuit 513 at operation S402, and terminates the thread 2 without performing the moving-up processing at operation S403.

On the other hand, if the counter values are approximately equal to each other (Yes at operation S401), it is considered that the oscillation-ON information has the periodicity. Therefore, the frequency characteristic detecting unit 512 waits by as much as the time T calculated through Equation (1) described above at operation S404.

After the waiting is finished, the frequency characteristic detecting unit 512 determines whether oscillation-ON information of the next period is transmitted and processing for changing an output voltage is started at operation S405. If the oscillation-ON information of the next period is transmitted (Yes at operation S405), the periodicity had already been lost. Therefore, the frequency characteristic detecting unit 512 terminates the thread 2 without performing the moving-up processing at operation S403.

On the other hand, if the oscillation-ON information of the next period is not transmitted (No at operation S405), the frequency characteristic detecting unit 512 performs the moving-up processing and transmits the oscillation-ON information at operation S406, and terminates the thread 2 at operation S403.

Thus, the time when the oscillation-ON information is transmitted is adjusted so that the time when the output voltage is increased is randomly changed. Consequently, the loudness of the ringing sound can be reduced.

Figure 13:
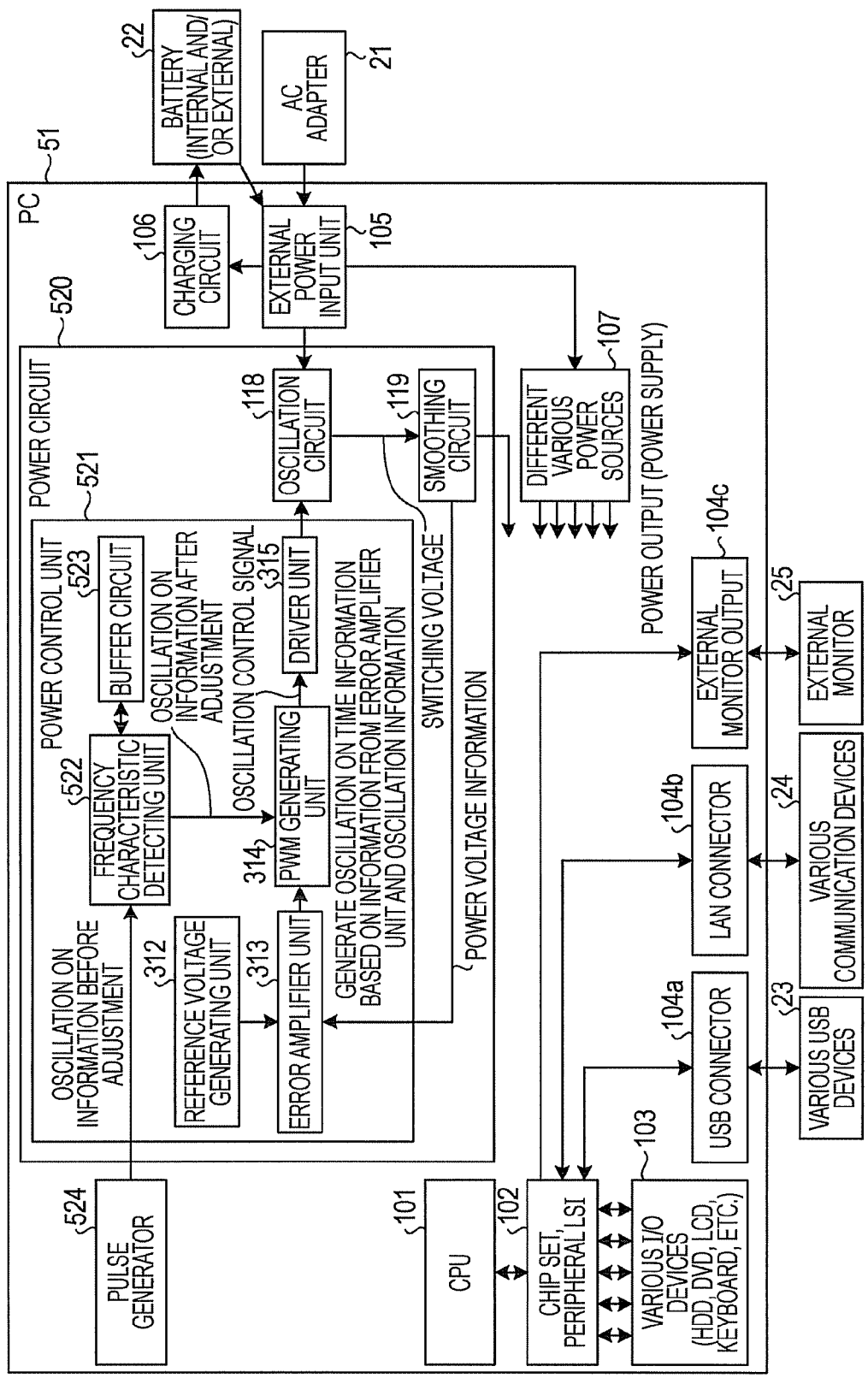
FIG. 13 illustrates an exemplary PC according to a second embodiment.

The power control method can be used for a PC 51 illustrated in FIG. 13, where the unadjusted oscillation-ON information of the PC 51 is supplied from a pulse generator 524 provided outside the power circuit 520. In that case, the frequency characteristic detecting unit 522 corresponding to the frequency characteristic detecting unit 512 illustrated in FIG. 11 detects the periodicity of the oscillation-ON information supplied from the pulse generator 524 through the buffer circuit 523, and adjusts the periodicity so that the time when the oscillation-ON information is transmitted becomes random.

An exemplary power control method may be used in analog-form power circuit and/or in a digital-form power circuit.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A power circuit comprising:
a determining unit configured to determine whether a control signal provided to control a power source has a fixed frequency characteristic; and
an adjusting unit configured to randomly change a time when a voltage transmitted to the power source is changed, within a prescribed range, when the determining unit determines that the control signal has the fixed frequency characteristic, and
wherein the prescribed range is set as a proportion of the fixed frequency characteristic.

2. The power circuit according to claim 1,
wherein the adjusting unit randomly changes the time when the voltage transmitted to the power source is changed within the prescribed range by moving forward the time when the voltage transmitted to the power source is increased.

3. The power circuit according to claim 1,
wherein the adjusting unit randomly changes the time when the voltage transmitted to the power source is changed within the prescribed range by delaying the time when the voltage transmitted to the power source is decreased.

4. The power circuit according to claim 1, wherein the adjusting unit gently changes a through rate of a signal transmitted to the power source by as much as a change in the time when the voltage transmitted to the power source is changed.

5. The power circuit according to claim 1,
wherein a buffer temporarily stores data used in detection of the fixed frequency characteristic.

6. An information processing apparatus comprising:
a memory; and
a processor configured to execute procedures in the memory including
determining whether a control signal provided to control a power source has a fixed frequency characteristic; and
randomly changing a time when a voltage transmitted to the power source is changed within a prescribed range when the determining unit determines that the control signal has the fixed frequency characteristic, and
wherein the prescribed range is set as a proportion of the fixed frequency characteristic.

7. The information processing apparatus according to claim 6,
wherein the adjusting unit randomly changes the time when the voltage transmitted to the power source is changed within the prescribed range, by moving forward the time when the voltage transmitted to the power source is increased.

8. The information processing apparatus according to claim 6,
wherein the adjusting unit randomly changes the time when the voltage transmitted to the power source is changed within the prescribed range by delaying time when the voltage transmitted to the power source is decreased.

9. The information processing apparatus according to claim 6, wherein the adjusting unit gently changes a through rate of a signal transmitted to the power source by as much as a change in the time when the voltage transmitted to the power source is changed.

10. An information processing apparatus according to claim 6,
wherein a buffer temporarily stores data used in detection of the fixed frequency characteristic.

11. A power control method comprising:
a determining operation provided to determine whether a control signal provided to control a power source has a fixed frequency characteristic; and
an adjusting operation provided to randomly change a time when a voltage transmitted to the power source is changed, within a prescribed range, when it is determined that the control signal has the fixed frequency characteristic at the determining operation, and
wherein the prescribed range is set as a proportion of the fixed frequency characteristic.

12. The power control method according to claim 11,
wherein, at the adjusting operation, the time when the voltage transmitted to the power source is changed is randomly changed within the prescribed range by moving forward the time when the voltage transmitted to the power source is increased.

13. The power control method according to claim 11,
wherein, at the adjusting operation, the time when the voltage transmitted to the power source is changed is randomly changed within the prescribed range by delaying the time when the voltage transmitted to the power source is decreased.

14. The power control method according to claim 11,
wherein, at the adjusting operation, a through rate of a signal transmitted to the power source is gently changed by as much as a change in the time when the voltage transmitted to the power source is changed.

15. The power control method according to claim 11,
wherein a buffer temporarily stores data used in detection of the fixed frequency characteristic.

16. A power control method comprising:
determining whether a control signal has a fixed frequency characteristic; and
adjusting to randomly change a time when a voltage transmitted to a power source is changed based on the determining, and
wherein the adjusting changes the time based on a proportional value of the fixed frequency characteristic.

17. The power control method according to claim 16,
wherein a buffer temporarily stores data used in detection of the fixed frequency characteristic.

* * * * *

UNITED STATES PATENT AND TRADEMARK OFFICE
CERTIFICATE OF CORRECTION

PATENT NO. : 8,433,932 B2
APPLICATION NO. : 12/618294
DATED : April 30, 2013
INVENTOR(S) : Shigeaki Nakazawa It is certified that error appears in the above-identified patent and that said Letters Patent is hereby corrected as shown below:

In the Claims:

Column 10, Line 1, In Claim 7, delete "changed" and insert -- changed, --, therefor.

Signed and Sealed this
Twenty-seventh Day of August, 2013

Teresa Stanek Rea
*Acting Director of the United States Patent and Trademark Office*